United States Patent Office 3,442,800
Patented May 6, 1969

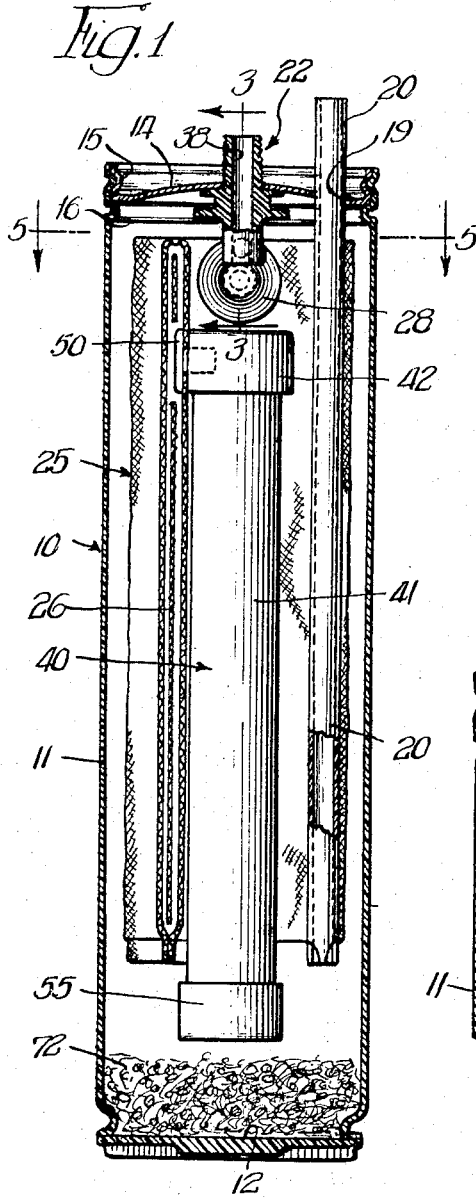
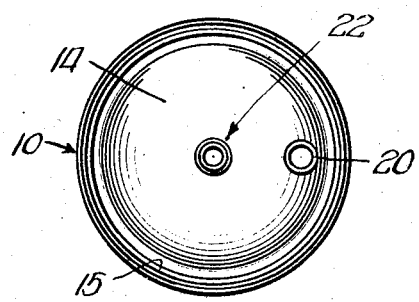
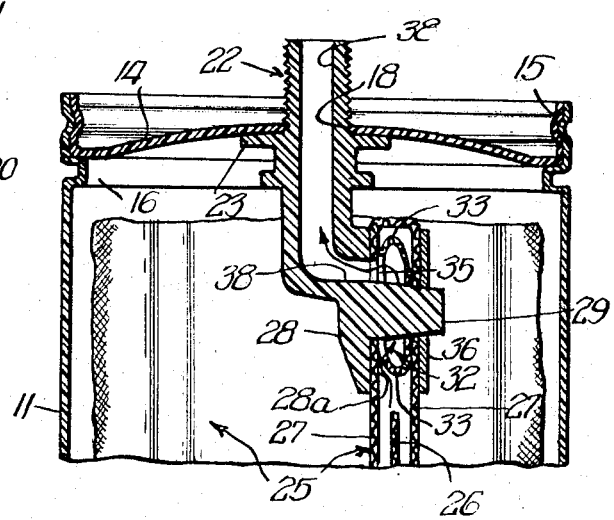

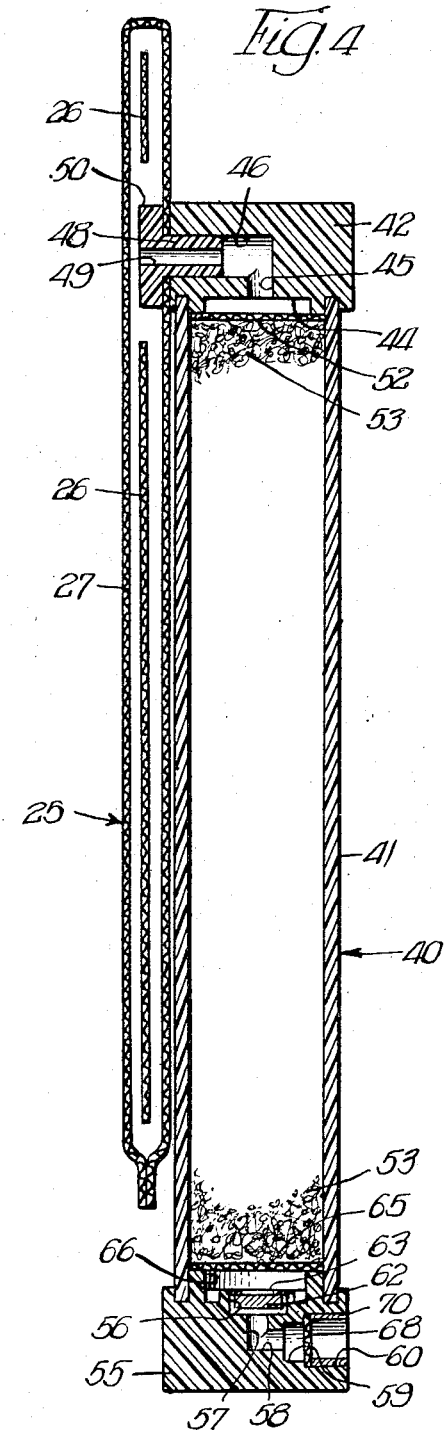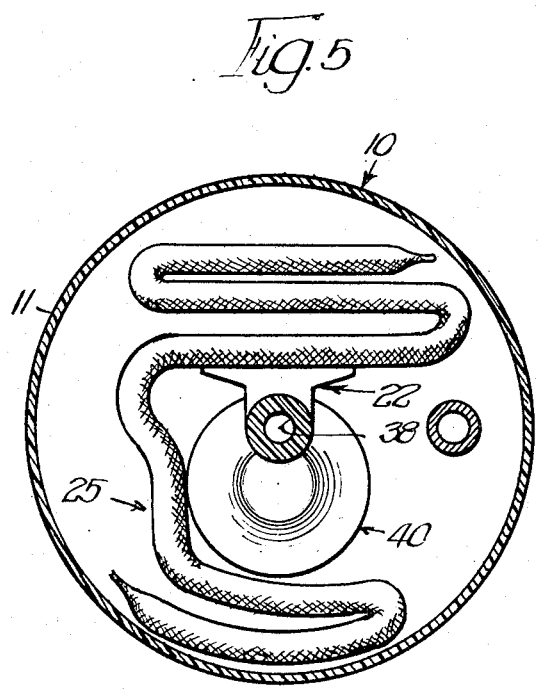

---

3,442,800
METHOD AND APPARATUS FOR FILTERING AND DOSING A LIQUID
Walter J. Jasionowski, Norridge, Ill., assignor to Everpure Inc., Oakbrook, Ill., a corporation of Nevada
Filed Mar. 18, 1965, Ser. No. 440,831
Int. Cl. C02b 5/00, 1/22; B01d 29/10
U.S. Cl. 210—57                                    11 Claims

ABSTRACT OF THE DISCLOSURE

The filtering vessel includes an inlet and an outlet and contains a folded filter bag the interior of which is in communication with the outlet of the vessel such that all of the liquid flowing from the latter is filtered. A treating vessel is contained within the filtering vessel exteriorly of the filter bag. The treating vessel has its outlet in communication with the interior of the filter bag. The inlet of the treating agent has a filter with substantially the same filtering characteristics as the filter bag.

---

The present invention relates, generally, to a method and apparatus for simultaneously filtering a liquid and treating or dosing the filtered liquid with an amount of a substance, which is soluble in the liquid, in proportion to the flow thereof.

There are many situations where it is necessary or desirable to give a liquid, such as water, a purifying filtration treatment and also to treat or dose the filtered liquid with a predetermined concentration of a treating substance. An example of such a situation is in the use of vending machines.

Vending machines are coming into greater use for vending various liquids including coffee, carbonated beverages, etc. These vending machines are normally connected to the nearest city water supply line. The available water will vary widely from city-to-city and town-to-town across the country. In many municipal water systems where chlorine is used to treat the water supply a noticeable residue of chlorine will be present in the drinking water. This, or other flavor problems, can interfere with the optimum flavor or taste of the vended liquids. Furthermore, the water coming to the vending machine will often have considerable hardness, and this creates a problem, particularly in vending machines serving hot beverages such as coffee. The heating elements of these vending machines become scaled resulting first in poor heat transfer and ultimately in excessively constricted flow to the point where operation becomes faulty and expensive servicing is required.

Residual amounts of chlorine and/or other flavor-imparting substances may be removed by known filtering devices, especially those utilizing activated carbon which has a very large capacity to absorb such off-flavor creating substances as chlorine. The scaling can be prevented by dosing the water with various known chemicals such for example as complex sodium polyphosphates. However, there is a real need for a simple method and also a simple apparatus which would be free from moving parts, such as loaded diaphragms that get out of adjustment and tiny orifices that become clogged and require frequent cleaning, that could be used for accurately filtering and dosing a liquid, such as the water going into a vending machine for vending coffee. Similarly there is a need for such an apparatus and method to filter and treat or dose water used in coffee making machines in restaurants, and numerous other uses in connection with water and other liquids.

Accordingly, one primary object of the present invention, generally stated, is the provision of simple, inexpensive, easily installed and serviced apparatus for filtering water or other liquids and simultaneously accurately treating or dosing the same with a solution having a predetermined concentration of a soluble treating agent, such apparatus being free from moving parts, motors, pumps, adjustable valves, diaphragms, small orifices, etc. with the proportion between the filtered liquid and the treating solution remaining substantially constant regardless of the frequency or liquid flow therethrough, the rate of flow therethrough within wide limits, variations in pressure on the lquid within wide limits, and changes in the filtering characteristics of the filter element.

Another primary object of the present invention is the provision of a new and improved method of filtering and treating a liquid which includes the step of using separate areas of filtering media to control the proportion of the solution of treating or dosing agent in the liquid.

A more specific object of the invention is the provision of apparatus of the class described which is particularly useful in filtering and treating water used for vending machines and the like.

Certain other objects of the invention will, in part, be obvious, and will in part appear hereinafter. For a more complete understanding of the nature and scope of the invention reference may now be had to the accompanying drawings wherein:

FIG. 1 is a vertical sectional view taken through one embodiment of the apparatus of this invention;
FIG. 2 is a top plan view of the apparatus illustrated in FIG. 1;
FIG. 3 is an enlarged section taken along line 3—3 of FIG. 1;
FIG. 4 is an enlarged vertical central section taken through a tubular container forming a part of the apparatus of this invention; and
FIG. 5 is an enlarged section taken along line 5—5 of FIG. 1.

Referring now to the drawings, the apparatus of this invention includes a cylindrical vessel generally designated 10. Vessel 10 may be of metallic construction, for example, and stressed for containing a liquid under pressure, or vessel 10 may be of molded plastic construction for being received in a cylindrical pressure vessel. In the embodiment of the invention illustrated, vessel 10 is in the form of a molded cylindrical member 11 having an integral bottom 12 and closed at its top by a cover 14, also made of the same material as casing 11. Cover 14 has a marginal flange 15 sealingly secured in the open end of vessel or casing 11 with the marginal underside of the cover resting on an annular shoulder 16 formed in casing 11. Cover 14 includes a central opening 18 (FIG. 3) and another opening 19 (FIG. 1) offset from the center of cover 14. An inlet tube 20 is fitted tightly in opening 19 and extends into the interior of vessel 10 longitudinally thereof. A fitting 22 extends through opening 18 of the cover, which fitting has an integral annular flange 23 suitably secured to the underside of the cover in sealing relation therewith. It will be understood that vessel 10 is adapted to be received within a cylindrical vessel, as in a vending machine for example, with tube 20 connected to a source of liquid to be filtered and with fitting 22 connected with suitable conduit means for directing the filtered and treated liquid to the appropriate component or components of the vending machine. If desired, vessel 10 and the other components therein may be made of inexpensive materials so that vessel 10 may be disposed of after use thereby obviating recharging of the filtering and treating materials to be referred to hereinbelow.

A filter element 25 is disposed within vessel 10 for purifying and filtering the liquid passing through the latter. Element 25 includes a porous or foraminous, substantially rigid but bendable, inner supporting member 26, such as a wire mesh screen, which is enclosed between a piece of suitable filter fabric 27 doubled upon itself and having its margins which extend beyond the edges of the supporting member tightly sealed together. The doubled sealed-together fabric, which may be termed a filter bag, is then folded upon itself a number of times for being received within vessel 10 with the folds extending longitudinally of casing 11. Such a filtering element, which may be of the type disclosed in Oliver Patent 3,055,503, provides a compact filter having a large filtering surface area.

As noted in FIG. 3, fitting 22 includes an integral, generally vertically extending disk-like portion 28 having an annular face 28a concentric with a central stem 29 which extends through suitable openings in fabric 27 of filter element 25. A hollow, disk-like spacer member 32 is disposed within filter element 25 around stem 29. Member 32, which prevents the fabric walls of filter bag 25 from contacting or collapsing in the area around stem 29, includes a plurality of peripheral openings 33 which communicate the interior of member 32 with the interior of element 25. Spacer member 32 also includes an enlarged annular opening 35 on the side thereof adjacent face 28a. A retaining washer 36 is fitted on the end of stem 29 thereby to secure the filter element against face 28a of fitting 28. Fitting 22 includes a central bore 38 opening at the top of the fitting and opening at annular face 28a closely adjacent stem 29. It should be apparent that filtered liquid within element 25 is discharged from the latter by passing through openings 33, and then through opening 35 into bore 38.

A tubular container 40 is disposed within vessel 10 between the folds of filter 25. Container 40 is adapted to hold a charge of soluble treating or dosing material, such as crystals of sodium polyphosphate or other treating materials preferably of the type which dissolve quickly to form saturated solutions. Tubular member 40, which extends longitudinally of vessel 10, is preferrably formed of plastic construction including a sleeve 41 closed at its upper or outlet end by a plug 42. Plug 42 includes a cylindrical recess 44 having a central bore 45 opening at a right angle into a bore 46 which opens exteriorly of plug 42. A fitting 48 extends through a suitable opening in fabric 27 of filter bag 25, which fitting includes a central through opening 49 communicating with the interior of filter bag 25 with bore 46 of plug 42. Fitting 48 includes an annular flange portion 50. Fabric 27 of the bag is clamped between flange 50 and the outer surface of plug 42 around bore 46 therein thereby serving as a means for securing tubular container 40 to filter bag 25. A screen 52 is suitably secured to plug 42 over recess 44 to prevent the scape of the treating material, designated 53, from the interior of tubular container 40.

A cylindrical plug 55, similar to plug 42, is secured to the lower or inlet end of tube 41 for closing the same. Plug 55 includes a circular recess 56 communicating with a bore 57 which in turn communicates at a right angle with another bore 58. Bore 58 communicates with increasing diameter bores 59 and 60. A check-valve disk 62 is loosely received within circular recess 56, and is prevented from being forced out of the recess by suitable stops or fingers 63 fitted around circular recess 56. Disk 62 seats on the base of recess 56 closing bore 57 to prevent a back flow of liquid from tubular container 40 at the inlet end thereof. Disk 62 is lifted from the base of circular recess 56 upon a flow of liquid through the various bores 60, 59, etc. to allow a flow of liquid through container 40 from its inlet end to its outlet end. The incoming liquid flows around the periphery of disk 62 which has a diameter less than the diameter of recess 56. Stops 63 are not continuous around the opening of circular recess 56 so as not to impede the flow of incoming liquid into tubular container 40. A screen 65 rests on annular lip 66 of plug 55 thereby to prevent the treating material from entering into the various recesses and bores in plug 55.

A small filter 68, preferably formed of the same material as fabric 27 of filter element 25, is supported across bore 59 which may be termed the inlet port of tubular container 40. The inner marginal portion of filter 68 rests against the annular flange defined by the juncture of bores 59 and 60, and filter 68 is held in this position by a sleeve 70 which is fitted within bore 60 with its inner ends in engagement with the outer marginal area of filter 68.

When the device of this invention is to be used, a charge of powdered filtering media, such as a material having finely divided particles of activated charcoal as its principal element, is placed in the bottom of casing 11. This charge is indicated by numeral 72 in FIG. 1. Tubular container 40, which is filled with a suitable treating agent, is secured to filter element 25 as illustrated in FIG. 3. Bag 25 is then folded as illustrated in FIG. 5, and inserted within vessel 10 along with tubular container 40. Cover 14, having fitting 22 and tube 20 secured in the openings therein, is then fitted in the open end of the vessel. As mentioned above, vessel 10 and all the components therein may be made of inexpensive materials so that the entire filtering and treating apparatus may be disposable thereby obviating recharging the vessel or replenishing the treating agent in container 40. Next, vessel 10 is disposed within a cylindrical pressure vessel with fitting 22 and tube 20 connected to the appropriate conduits as mentioned above.

The liquid entering the vessel 10 through tube 20 forms a slurry with powder charge 72; this slurry is deposited on substantially the entire surface of filter element 25. The incoming liquid is filtered and purified as it passes through the coating on the exterior of filter element 25. The filtered and purified liquid passes through the openings in the fabric walls of the bag, and is then discharge through outlet opening 38 of fitting 22.

The incoming liquid is of course also admitted into the interior of tubular container 40 through ports 60, 59, etc. This incoming liquid is filtered as it passes through filter 68 in the same manner as the liquid entering filter element 25 is filtered. As the liquid passes through container 40, it forms a susbtantially saturated solution with the treating material therein, which solution is then admitted into the interior of filter bag 25 through bores 45, 46 and opening 49 in fitting 48. In this way, the filtered liquid within filter element 25 is treated or dosed with the solution of treating agent within tubular container 40.

Each time there is a flow of liquid through the filter element 25 in vessel 10, there is a proportional flow through tubular container 40. The effective area of filter 68, i.e. the area determined by the diameter of bore 59, determines the rate of flow through treating container 40; the ports or bores 58, 57, 56, 45, 46, 49 have a diameter or area sufficient to accommodate maximum flow through filter 68. Accordingly, the relationship between the surface area of element 25 and the effective area of filter 68 determines the proportion of the treating agent in the liquid.

As it will be apparent to those skilled in the art, the flow and filtering characteristics of filter element 25 change during its filtering life. One of the reasons for the change of these characteristics is the chemical and/or physical changes occurring in the coating on the outside surface of the bag. Since filter 68 in the inlet port of tubular container 40 is formed of the same material as that used in making filter bag 25, as the flow characteristics of filter element 25 change these same changes occur on filter 68. Accordingly, the proportion of the substantially saturated solution of treating agent admitted to the liquid flowing through the apparatus remains substantially constant throughout the life of the filter element. In other words, as the flow through filter element 25 diminishes because of clogging and because of chemical and/or physical changes in the coating on the same, for example, the flow across filter 68 diminishes at the same rate because of corresponding or proportional clogging and changing of the film on filter 68. It should be pointed out, that filter 68 and bag 25 need not necessarily be formed of identical material. Constant proportional treating or dosing is achieved as long as filter 68 is formed of material having substantially the same filtering characteristics as the material used to form bag 25. That is, the proportion between the solution of treating agent and the filtered liquid in element 25 will remain substantially constant throughout the life of the latter as long as the materials used to form the bag and filter 68 have substantially the same pressure drop, substantially the same tendency to clog, and substantially the same powder supporting characteristics, etc.

It will be noted that the outlet of tubular container 40 opens into filter element 25 near the outlet of the latter. More accurate treating or dosing is achieved by locating the tubular container outlet in this manner because of the more constant or uniform flow pattern in filter element 25 in the area around its outlet. However, the outlet of container 40 can be made to discharge directly into the outlet passageway 38 for the filtered liquid.

It should be realized that the effective diameter of filter 68 might be made adjustable so as to provide a means for readily varying the proportion between the flow of filtered liquid and the solution of treating agent.

It should be apparent that this invention provides a simple but nevertheless extremely accurate apparatus for treating or dosing a liquid with a solution of treating agent according to a predetermined proportion, and that the apparatus of this invention embodies unique features of construction so that this proportion remains substantially constant throughout the filtration cycle life of the filtering element or until the time the filtering and treating chemicals require recharging. Also, it will be realized that by the construction of the apparatus of this invention this proportion between the filtered liquid and the solution of treating agent will remain constant regardless of varying operating conditions, such as the frequency and rate of flow through the apparatus, variations in pressure on the liquid, etc.

The present invention also encompasses a method for filtering and treating a liquid. The embodiment of the apparatus disclosed above illustrates one apparatus for carrying out the method of this invention.

The method includes the first step of dividing an influent liquid into two separate streams or flow paths. The method then includes the step of passing both of the streams (while maintaining the streams in separated relation) through respective predetermined pressure responsive filter areas that respond similarly to influent fluid characteristics to maintain constant proportional flows throughout a filtration service cycle. Both filter areas have substantially the same filtering characteristics. Next, one of the streams is passed through a dosing agent soluble in the liquid thereby to form and displace a saturated slution of the dosing agent. Finally, the streams are mixed together thereby providing a filtered and treated liquid.

It will be appreciated that the proportion of the solution of treating agent introduced into the liquid is governed by the relative effective areas of the filtering media. (The term effective area means the area or portion of the filtering media through which the liquid actually passes.) That is, it is the relative areas of filtering media which determine this proportion as opposed, for example, to the areas or sizes of the conduits or containers for the liquid. Since the filter areas are formed of filtering media having substantially the same filtering characteristics, the proportion of the treating agent in the liquid remains constant during a filtering cycle.

As pointed out above in connection with the description of the apparatus of this invention, as one filter area changes its filtering characteristics because of clogging and chemical or physical changes, the other filter area changes in the same manner because it has substantially the same filtering characteristics. Therefore, the method of this invention includes the unique step of passing the separated streams through two areas of filtering media having substantially the same filtering characteristics thereby to establish or set up a proportion of the treating agent in the liquid, and this proportion is maintained substantially constant because both filter areas have substantially the same filtering characteristics.

While the invention has been shown in but one form, it will be obvious to those skilled in the art that it is not to be so limited. For example, the invention may be used with filters other than the precoat type of filter element illustrated as long as the media of the main filtering element and the media of the filter at the inlet of the treating agent container are substantially the same. Further, it will be realized that the invention is not to be limited to use in vending machines, as the invention is susceptible of various changes and modifications without departing from the spirit and scope of the appended claims.

I claim:

1. A filtering and treating apparatus comprising, means defining a first vessel having an inlet for receiving a liquid to be filtered and an outlet for discharging the liquid, a filter element in said first vessel arranged so that the liquid from said inlet must pass through the element to be discharged through said outlet, and thereby defining a first space adapted to receive the liquid to be filtered and a second space adapted to receive the liquid after it has been filtered, means defining a second vessel adapted to contain a soluble treating agent, said second vessel having an inlet in communication with said first space and an outlet in communication with said second space, whereby a liquid flowing through said filter element is treated in said second space with a solution of the liquid and the treating agent according to a predetermined proportion, the inlet of said second vessel having substantially less surface area than the surface area of said filter element, and filtering means across the inlet of said second vessel, which filtering means has substantially the same filtering characteristics as said filter element thereby to maintain said proportion substantially constant during varying operating conditions throughout the filtration cycle life of the filter element.

2. The filtering and treating apparatus comprising, means defining a vessel having an inlet for receiving a liquid and an outlet for discharging the liquid, a filter element in said vessel having a relatively large filtering surface area and separating said vessel into a first chamber in communication with said inlet for receiving the liquid to be filtered and a second chamber for receiving the liquid after it has been filtered through said filter element, which second chamber is in communication with said outlet for discharging the filtered liquid, a container adapted to contain a soluble treating agent, said container having an inlet port in communication with said first chamber and an outlet communicating with said second chamber, whereby upon a flow of liquid through said filter element a solution of treating agent is formed and admitted to the filtered liquid in said second chamber according to a predetermned proportion, the area of said inlet port being small relative to the surface area of said filter element, a filter supported across said inlet port, which filter has substantially the same filtering characteristics as said filter element thereby to filter the liquid forming said solution and to maintain said proportion substantially constant during varying operating conditions throughout the filtration cycle life of the filter element.

3. A filtering and treating apparatus comprising, means defining a vessel having an inlet for receiving a liquid and an outlet for discharging the liquid, a filter element in said vessel, said element including a folded closed bag having its outer surface exposed to the liquid entering said vessel and its interior in communication with said outlet, a container disposed in said vessel exteriorly of said bag and adapted to contain a soluble treating agent, said container having an inlet port with an area relatively small with respect to the surface area of said bag, said container having an outlet communicating with the interior of said bag, whereby upon a flow of liquid through said filter element a solution of treating agent is formed and admitted to the filtered liquid in said bag according to a predetermined proportion, a filter across said inlet port, which filter has substantially the same filtering characteristics as said bag thereby to filter the liquid entering said container and to maintain said portion substantially constant during varying operating conditions throughout the life of the filter element.

4. The apparatus according to claim 3 wherein said bag is formed of fabric material and wherein the filter in said inlet port is made of the same material.

5. A filtering and treating apparatus comprising, a closed cylindrical vessel having an inlet and an outlet, a filter element in said vessel, said element consisting of a closed bag folded upon itself a number of times with the folds extending longitudinally of the vessel, a fitting connecting the interior of said bag with said outlet, a tubular container in said vessel extending longitudinally thereof and being exterior of the bag, which container is adapted to contain a soluble treating agent, said container having an outlet adjacent one end thereof and means connecting the outlet with the interior of said bag, said container having an inlet port adjacent the other end thereof, whereby upon a flow of liquid through said filter element a solution of treating agent is formed and admitted to the filtered liquid in said bag according to a predetermined proportion, which inlet port has an area relatively small with respect to the surface area of said bag, a filter across said inlet port, which filter has substantially the same filtering characteristics as said bag, thereby to filter the liquid entering said container and to maintain said proportion substantially constant during varying operating conditions throughout the life of the filter element.

6. The apparatus according to claim 5 wherein said bag is formed of fabric material and wherein the filter in said inlet port is made of the same material.

7. The apparatus according to claim 5 wherein said means for connecting the container outlet with the interior of the bag includes another fitting extending through the wall of the bag and being proximate the first mentioned fitting.

8. An apparatus for filtering and dosing a liquid comprising, first and second liquid containers each having an inlet and an outlet, said second container being adapted to contain a supply of a dosing agent soluble in the liquid, filtering means including at least two predetermined areas of filtering media having substantially the same filtering characteristics, one of said areas being associated with said first container for filtering the liquid entering its inlet and the other of said areas being associated with said second container for filtering the liquid entering its inlet, means mounting the outlet of said second container within said first container in the area of the latter downstream of said first filtering area thereby to discharge the solution of dosing agent directly to the filtrate of said first filter area, whereby said areas control the proportion of the dosing solution in the liquid being filtered.

9. The apparatus according to claim 8 wherein said one area is substantially greater than said second area.

10. A chemical dosing apparatus for treating a liquid, said apparatus comprising filtering means including at least two predetermined areas of filtering media having substantially the same filtering characteristics, means for dividing and separating a liquid to be treated into two streams, a dosing chamber for holding a chemical soluble in the liquid being filtered and treated, means for directing one of the streams through one of said areas, an outlet for receiving said one stream after it has passed through said one filter area, means for directing the other stream of liquid through the other filter area and then into said chamber to dissolve some of the chemical therein, said chamber having an outlet, other means mounting said last mentioned outlet in said one stream between said one filter area and said first mentioned outlet, whereby the liquid is filtered and treated with a dosing chemical in a proportion governed by the relative areas of filtering media.

11. The method for filtering and dosing a liquid comprising the steps of: dividing an influent liquid into two separate streams, maintaining the streams in separated relation and passing both of the streams through respective filter areas of filtering media having substantially the same filtering characteristics and of predetermined area relative to each other, next passing one of said streams through a dosing agent soluble in the liquid thereby to form a solution of the dosing agent, and then mixing both of said streams together, so that the proportion of dosing solution in the liquid is controlled by the relative areas of filtering media and maintained substantially constant throughout a filtration cycle because of the similarity in the filtering characteristics of the filter areas.

References Cited

UNITED STATES PATENTS

| 3,240,337 | 3/1966 | Cook | 210—203 X |
| 1,620,431 | 3/1927 | Bramwell | 210—340 X |
| 2,546,317 | 3/1951 | Prizer | 210—101 X |
| 3,055,503 | 9/1962 | Oliver | 210—238 |
| 3,120,490 | 2/1964 | Samson | 210—340 X |

FOREIGN PATENTS 250,757   9/1962   Australia.

REUBEN FRIEDMAN, *Primary Examiner.*

JOHN ADER, *Assistant Examiner.*

U.S. Cl. X.R.

210—318, 316, 206, 203, 74, 73